US012485849B2

(12) United States Patent
Ive et al.

(10) Patent No.: US 12,485,849 B2
(45) Date of Patent: Dec. 2, 2025

(54) KEY FOR TURNING ON A ROAD VEHICLE AND RELATIVE ROAD VEHICLE

(71) Applicant: FERRARI S.P.A., Modena (IT)

(72) Inventors: Jonathan P. Ive, San Francisco, CA (US); Eugene Whang, San Francisco, CA (US); Jeremy Bataillou, San Francisco, CA (US); Anthony Ashcroft, San Francisco, CA (US); Suhang Zhou, San Francisco, CA (US); Benoit Louzaouen, San Francisco, CA (US); Jemima Kiss, San Francisco, CA (US); Christopher Wilson, San Francisco, CA (US); Wan Si Wan, San Francisco, CA (US); Biotz Natera, San Francisco, CA (US); James Mcgrath, San Francisco, CA (US); Roger Guyett, San Francisco, CA (US); Joseph Luxton, San Francisco, CA (US); Michael Matas, San Francisco, CA (US); Patrick Kessler, San Francisco, CA (US); Maximilian Romani, Modena (IT); Vito Conigliaro, Modena (IT)

(73) Assignee: FERRARI S.P.A., Modena (IT)

( * ) Notice: Subject to any disclaimer, the term of this patent is extended or adjusted under 35 U.S.C. 154(b) by 119 days.

(21) Appl. No.: 18/498,628

(22) Filed: Oct. 31, 2023

(65) Prior Publication Data
US 2024/0149830 A1    May 9, 2024

(30) Foreign Application Priority Data
Nov. 4, 2022  (IT) .......................... 102022000022608

(51) Int. Cl.
*B60R 25/24*    (2013.01)
*B60Q 3/292*    (2017.01)

(52) U.S. Cl.
CPC ............ *B60R 25/248* (2013.01); *B60Q 3/292* (2017.02); *B60R 2325/105* (2013.01)

(58) Field of Classification Search
CPC .. B60R 25/248; B60R 2325/105; B60Q 3/292
See application file for complete search history.

(56) References Cited

U.S. PATENT DOCUMENTS 3,953,720 A * 4/1976 Kelch .................... G07B 13/00
                                                                377/55
5,399,002 A * 3/1995 Taylor .................... B60T 17/16
                                                                188/1.11 R (Continued)

FOREIGN PATENT DOCUMENTS

CN        86202303 U  *  1/1987
CN      204472683 U  *  7/2015

(Continued)

OTHER PUBLICATIONS

Italian Search Report for Application No. 202200022608; Filing Date, Nov. 4, 2022; Mailing Date, Mar. 31, 2023; 7 pages.

*Primary Examiner* — Chico A Foxx
(74) *Attorney, Agent, or Firm* — CANTOR COLBURN LLP

(57) ABSTRACT

Road vehicle comprising a powertrain system; an ignition system for the powertrain system comprising in turn a slot integral with the passenger compartment of the road vehicle and configured to receive and accommodate a key for the ignition of the road vehicle; wherein the ignition system comprises a detection system, configured to detect the presence or absence of the key at the slot, and a control unit, which is connected to the detection system and to the powertrain system and is configured to enable the power supply to the powertrain system only when the key is detected at the slot.

14 Claims, 12 Drawing Sheets

(56) References Cited

U.S. PATENT DOCUMENTS

| | | | | |
|---|---|---|---|---|
| 5,982,888 A * | 11/1999 | Luckeneder | G07C 9/00857 | 713/185 |
| 6,879,242 B1 * | 4/2005 | Alon | E05B 49/006 | 340/5.23 |
| 7,053,866 B1 * | 5/2006 | Mimran | G02B 27/01 | 359/630 |
| 10,870,411 B1 * | 12/2020 | Schafer | G07C 9/28 | |
| 2006/0113841 A1 * | 6/2006 | Dornbach | B60R 25/04 | 307/10.3 |
| 2007/0056792 A1 * | 3/2007 | Hildebrand | B60R 25/24 | 307/10.6 |
| 2007/0252681 A1 * | 11/2007 | Costello | B60Q 3/292 | 340/426.3 |
| 2009/0224895 A1 * | 9/2009 | Ballard | B60R 25/24 | 340/426.11 |
| 2011/0068895 A1 * | 3/2011 | Gee | E05B 77/48 | 340/5.67 |
| 2012/0316030 A1 * | 12/2012 | Choi | B60K 20/08 | 477/99 |
| 2013/0229820 A1 * | 9/2013 | Jutila | F21S 43/14 | 362/545 |
| 2014/0292527 A1 * | 10/2014 | Sisneros | H05B 47/19 | 340/693.1 |
| 2015/0171659 A1 * | 6/2015 | Lee | H02J 50/90 | 320/108 |
| 2015/0251660 A1 * | 9/2015 | Nelson | B60K 28/10 | 340/576 |
| 2017/0018128 A1 * | 1/2017 | Berezin | G01S 5/0244 | |
| 2018/0079302 A1 * | 3/2018 | Tsai | B60K 20/08 | |
| 2020/0086785 A1 * | 3/2020 | Lee | G08B 21/22 | |
| 2021/0293335 A1 * | 9/2021 | Price | F16H 63/42 | |
| 2023/0264655 A1 * | 8/2023 | Reber | B60R 25/24 | 320/107 |

FOREIGN PATENT DOCUMENTS

| | | | | |
|---|---|---|---|---|
| CN | 206623831 U | * | 11/2017 | |
| EP | 2236363 A2 | * | 10/2010 | H04B 1/082 |
| IT | 201800010033 A1 | | 5/2020 | |
| JP | 2002264682 A | | 9/2002 | |
| WO | WO-2009021508 A2 | * | 2/2009 | B60R 25/04 |
| WO | WO-2016108155 A1 | * | 7/2016 | |
| WO | 2020095201 A1 | | 5/2020 | |

* cited by examiner

KEY FOR TURNING ON A ROAD VEHICLE AND RELATIVE ROAD VEHICLE

CROSS-REFERENCE TO RELATED PATENT APPLICATIONS

This patent application claims priority from Italian Patent Application No. 102022000022608, filed on Nov. 4, 2022, the entire disclosure of which is incorporated herein by reference.

TECHNICAL FIELD

The present invention relates to a key for turning on a road vehicle and to a relative road vehicle.

In particular, the present invention has an advantageous, but not exclusive, application in a key for turning on a high-performance road vehicle, to which the description that follows will refer explicitly, but without thus losing its general nature.

CONTEXT OF THE INVENTION

As known, over recent years, totally electric vehicle systems have increasingly been gaining a foothold, meaning those with a powertrain system provided exclusively with one or more electric motors, aimed at placing an ever-increasing distance between the automobile market and the fossil fuels on which it is still heavily dependent.

These vehicles, since they do not have an internal combustion engine, no longer need the so-called "key cycle", meaning the entire electromechanical procedure that leads to ignition of the combustion engine, such as by means of a starter motor.

In light of what has been said, in certain cases, totally electric vehicles have been developed that are configured to switch on (i.e., to activate the powertrain system and allow the gear to be engaged) automatically as soon as the presence of the vehicle key inside the passenger compartment is detected.

However, in such electric vehicles, it is basically impossible to switch off the vehicle when the driver is inside it, as it remains active and ready to depart for as long as the key is detected inside the passenger compartment. This leads to an excessive and unnecessary consumption of energy in the case of lengthy periods spent inside the vehicle, with a consequent greater wear of the electronic components responsible for supplying power to the powertrain system.

In contrast, however, vehicles have been developed on which, in order to assist drivers accustomed to the "key cycle", an ignition button of the road vehicle is present which (always after the key has been detected inside the passenger compartment) allows power supply to the powertrain system to be activated manually and therefore the vehicle to start. In these cases, however, in the case of totally electric vehicles, due to their silence, it is not immediately clear to the driver whether the vehicle is switched on and ready to depart, or whether it is necessary to press the button. In any case, on such vehicles, it is nonetheless necessary to press on the brake pedal at the same time, failing which the powertrain system will not switch on.

In general, there is a need to lengthen the autonomy of the electric road vehicle, and, at the same time to inform the driver of the state of ignition of said road vehicle in a simple and immediate manner.

Document JP2002264682 describes a switching device capable of improving prevention of thefts of a vehicle.

Document US2007056792 describes a device and a method for starting the engine of a vehicle equipped with an authentication device.

Document US2018079302 describes a system for the control of ignition and the selection of the gear of a vehicle.

Document IT201800010033 describes a control system for an automatic change of speed of a motor vehicle including a portable control device.

DESCRIPTION OF THE INVENTION

The object of the present invention is to provide a key for turning on a road vehicle and a relative road vehicle that are at least partially free from the problems described here above and, at the same time, are simple and cheap to manufacture.

According to the present invention, a key for turning on a road vehicle and a relative road vehicle are provided according to what is claimed in the independent claims that follow and, preferably, in any one of the claims that are directly or indirectly dependent upon the independent claims.

The claims describe preferred embodiments of the present invention and form an integral part of this description.

BRIEF DESCRIPTION OF THE DRAWINGS

Several embodiments of the invention will be described below for a better understanding of it, by way of non-limiting example and with reference to the attached drawings, wherein.

EMBODIMENTS OF THE INVENTION

Figure 1:
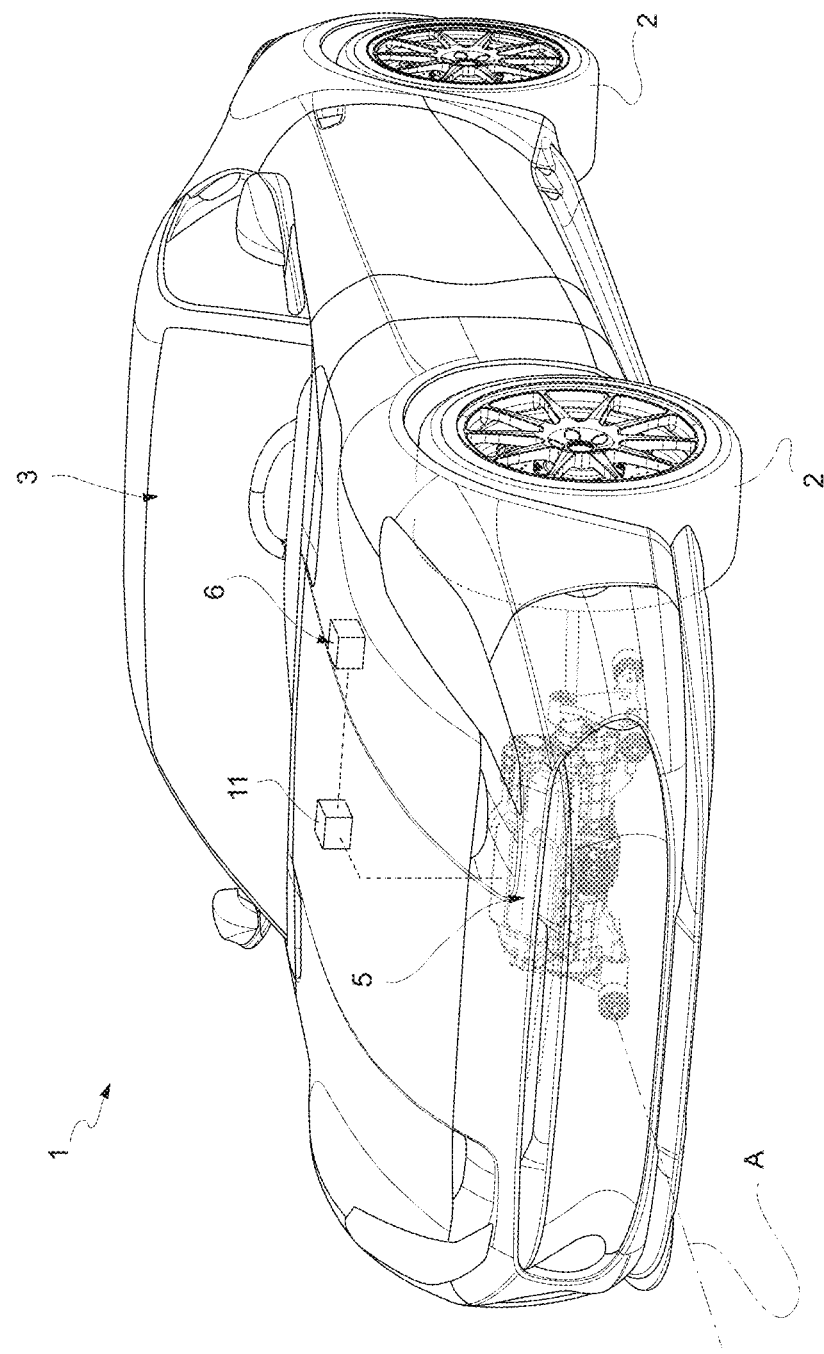
FIG. 1 is a perspective and schematic view, with parts removed for clarity, of a possible embodiment of a road vehicle according to the present invention.
Figure 2:
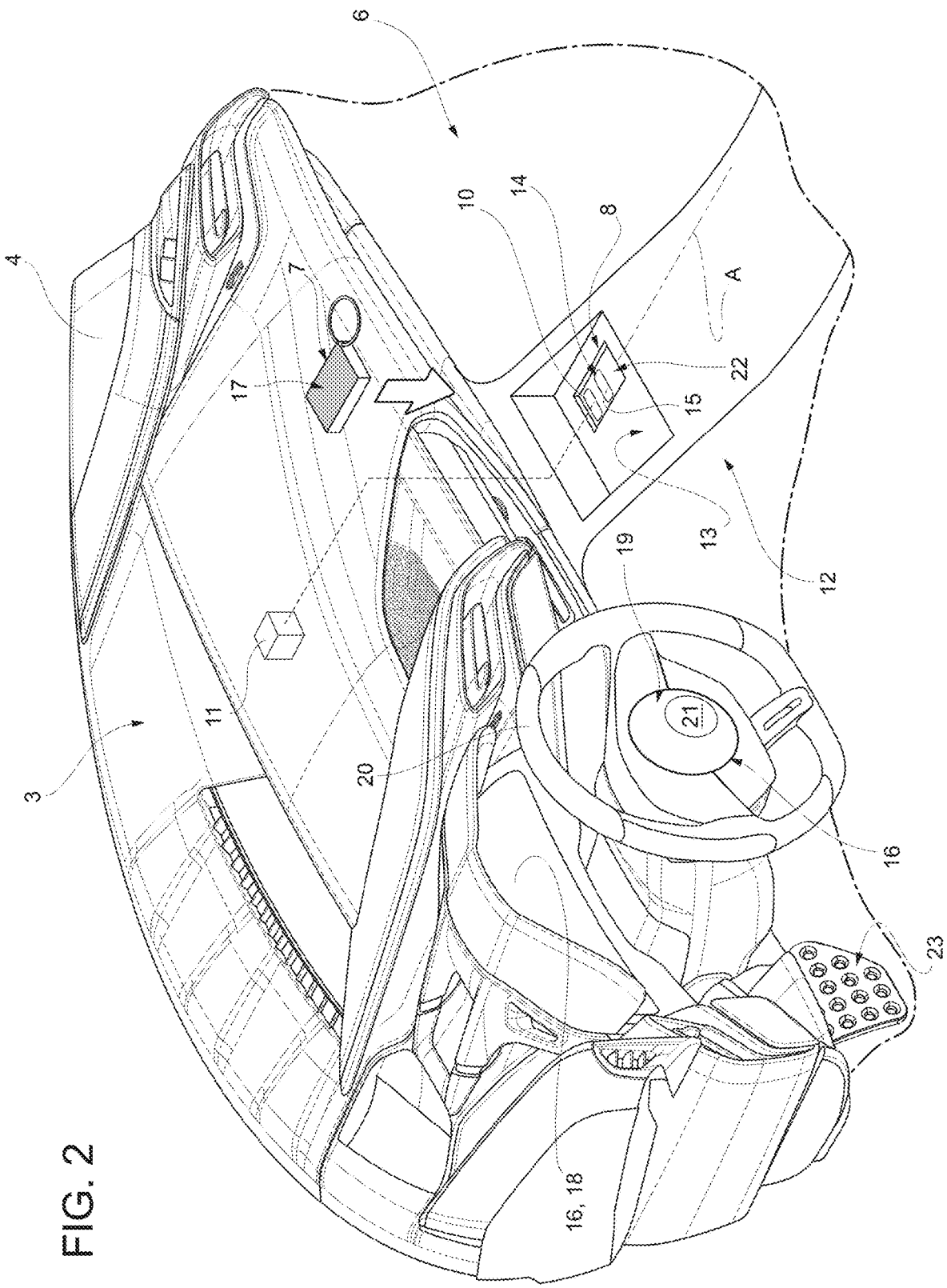
FIG. 2 is a perspective and schematic view of part of the interior of the passenger compartment of the vehicle of FIG. 1 in a switched-off configuration.

In FIG. 1, number 1 indicates as a whole a road vehicle provided with two front wheels 2 and two rear wheels 2 (in particular drive wheels). The vehicle 1 is provided with a passenger compartment 3 that is apt to accommodate at least a driver and preferably one or more passengers.

The same reference numbers and reference letters in the figures identify the same elements or components with the same function.

In this description, the term "second" component does not imply the presence of a "first" component. Such terms are, in fact, adopted as labels to improve clarity and should not be intended as limiting.

The elements and features illustrated in the different preferred embodiments, including the drawings, may be combined with or isolated from each other without deviating from the scope of protection of this application as described below.

Furthermore, the road vehicle 1 comprises a chassis (of a known type and therefore not illustrated in detail), and a vehicle dashboard 4 inside the passenger compartment and attached to the chassis. The vehicle dashboard is arranged in front of the driver and the passenger, if any.

In detail, and not in a limiting manner, the road vehicle 1 is an entirely electric vehicle, i.e., provided with a rechargeable battery pack (of a known type and therefore not further detailed below).

In particular, the road vehicle 1 comprises a powertrain system 5, which is provided with at least an electric motor and circuitry dedicated to power supply and control of said motor and of the battery pack.

The road vehicle 1 also comprises an ignition system 6 of the powertrain system 5. In other words, the ignition system 6 is configured to perform the known functions of "key-on" and "key-off", i.e., switching on and switching off the powertrain system 5. In particular, the ignition system 6 is configured to enable power supply from the battery pack to the powertrain system 5.

The ignition system 6 preferably comprises a vehicle key 7 (illustrated in detail in FIGS. 7 to 9) and a slot 8 integral with the passenger compartment 3 of the road vehicle 1 and configured to receive and accommodate the key 7 for the ignition of the road vehicle 1. In particular, the slot 8 is configured to serve as the housing for the key 7 and accommodate it at least partially inside it. Therefore, preferably but not in a limiting manner, the slot 8 comprises a depression 9 in which the driver may position the key 7 to switch on the road vehicle.

Advantageously, the ignition system 6 comprises a detection system 10 (preferably wireless, for example RFID, or magnetic induction), which is configured to detect the presence or absence of the key 7 at (or in) the slot 8.

In addition, the ignition system 6, i.e., the road vehicle 1, comprises a control unit 11, which is connected to the detection system 10 and to the powertrain system 5 and is configured to enable power supply from the battery pack to the powertrain system 5 exclusively when the key 7 is detected at the slot 8. In other words, in contrast with what occurs in the prior art, no button to be pressed simultaneously with the brake pedal is present and the vehicle is not maintained constantly switched on, including pointlessly, when it is not moving.

Physically, the control unit 11 may comprise a single device or several devices separate from each other and communicating by means of the local network (such as Ethernet or CAN) of the road vehicle 1. For example, the control unit 11 may also be delegated to perform further and different activities to ignition.

As illustrated in the non-limiting embodiments of FIGS. 2, 3, 8 and 9, the road vehicle 1 comprises a central tunnel 12 (i.e., the object normally used to contain the cabling and gearbox of the road vehicle 1 and to separate the driver zone from the passenger zone), arranged along a longitudinal symmetry axis A of the passenger compartment 3.

Preferably but not in a limiting manner, the slot 8 is arranged at the central tunnel 12, in particular facing upwards.

Figure 10:
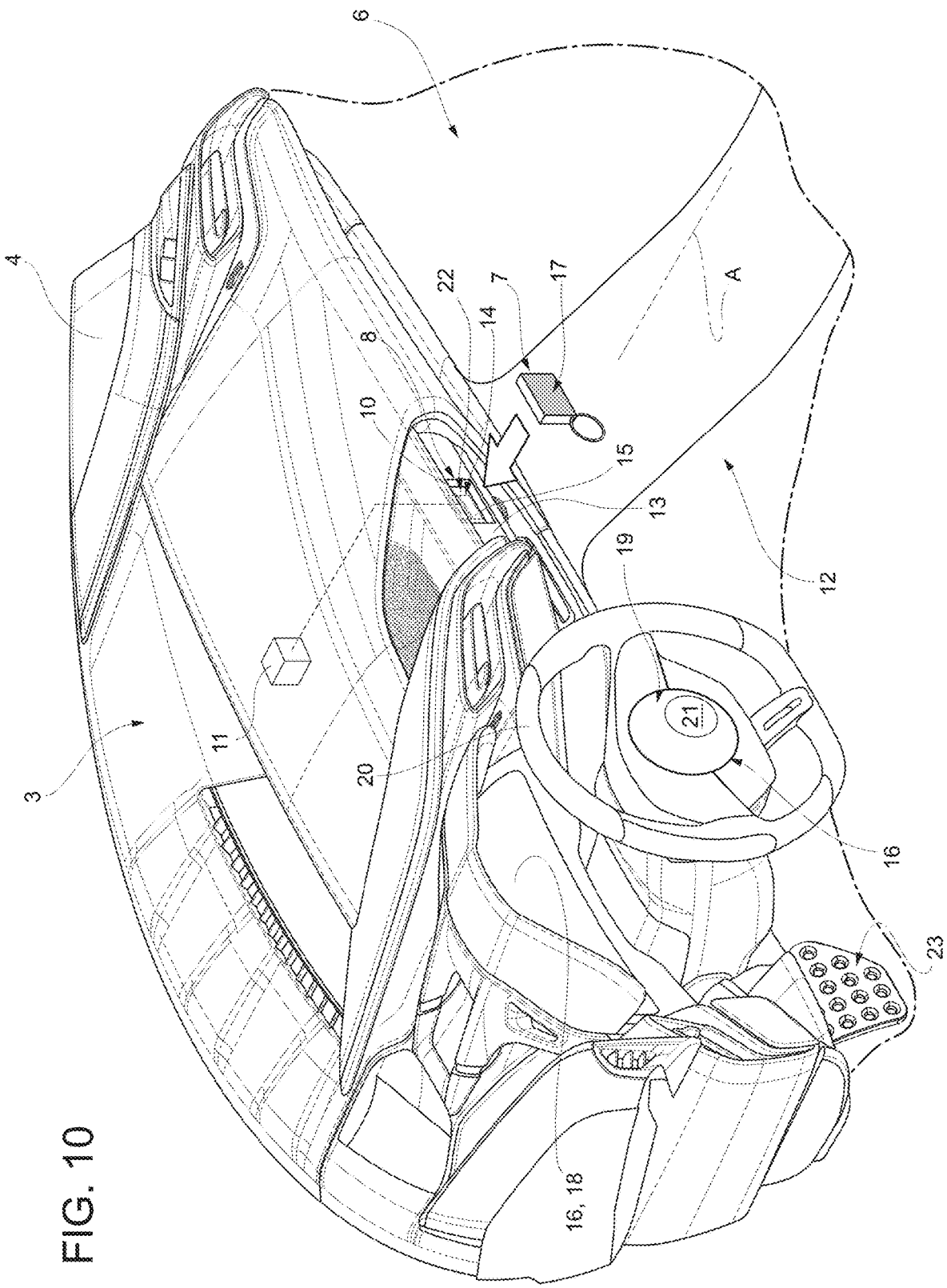
FIG. 10 is a perspective and schematic view of a further embodiment of the road vehicle.

In other non-limiting embodiments, such as the one illustrated in FIG. 10, the slot 8 is arranged at the dashboard 4, in particular on a central portion of the dashboard 4, in a manner that the depression 9 is facing towards the centre of the passenger compartment 3. In particular, therefore, the driver inserts the key 7 into the slot 8, and therefore the depression 9, horizontally.

In certain non-limiting cases, the slot 8 is positioned on an upper portion 13 of the central tunnel 12, in a manner that the depression 9 is facing towards the roof of the passenger compartment 3. In particular, therefore, the driver inserts the key 7 into the slot 8, and therefore the depression 9, vertically (as indicated by the arrows in the attached figures). In this manner, positioning of the key 7 is simplified.

Advantageously but not in a limiting manner, the slot 8 comprises a key locking system 14, which is configured to anchor the key 7 to the slot 8 in case the speed of the road vehicle 1 is greater than zero and/or a gear is engaged. In other words, in order to be able to remove the key 7 from the slot 8 once it has been inserted into it and has switched on the road vehicle 1, it is necessary for the vehicle to be still and in park mode (known as P).

According to several non-limiting preferred embodiments, the key locking system 14 comprises a magnetic locking element 15 selectively operable by the control unit 11. In particular, the magnetic locking element 15 is activated and therefore blocks the key 7 in the slot 8 during movement of the vehicle 1 and/or when the gear or reverse gear are engaged. Thanks to the magnetic locking element 15, insertion of the key 7 is further simplified, insofar as it is sufficient to position the key 7 close to the element 15, to ensure that the latter magnetically attracts it back into the depression 9 (i.e., into the correct position).

According to other non-limiting embodiments (not illustrated), the key locking system 14 comprises a mechanical locking element 15, which is operable by the control unit 11 and is configured to block the key 7 inside the slot 8 through interference.

Advantageously but not in a limiting manner, the vehicle 1 comprises a luminous element 16 inside the passenger compartment 3 (in particular, at the dashboard 4), which is configured to assume a first colour (for example, grey or black) when the key 7 is not detected inside the slot 8 and a second colour (for example, yellow or red) when the key is detected inside the slot.

In particular, the first colour and the second colour are different to each other. In this manner, the driver can immediately understand, both from the position of the key and (without turning around) from the colour of the luminous element 16.

At the same time and with the same criterion, advantageously but not in a limiting manner, the ignition system 6 (in particular, the control unit 11) is configured to emit a signal, in particular at the slot 8, that causes a colour change of at least part 17 of the key 7. In other words, the key 7 detects said signal, therefore understands that it is accommodated in the slot 8, and changes colour at least in part 17.

Preferably but not in a limiting manner, the colour change controlled by the control unit is from a third colour (for example, yellow or red) to a fourth colour (for example, black or grey), following positioning of the key 7 at the slot 8, and vice versa when the key 7 is removed from the slot 8.

Advantageously but not in a limiting manner, the third colour is equal to the second colour and the fourth colour is equal to the first colour. In this manner, substantially, in placing the key 7 inside the slot 8, the driver perceives the change of the colour from part 17 of the key 7 to the road vehicle 1, in particular to the luminous element 16.

In certain, non-limiting cases, the luminous element 16 is part of a control panel 18.

Figure 3:
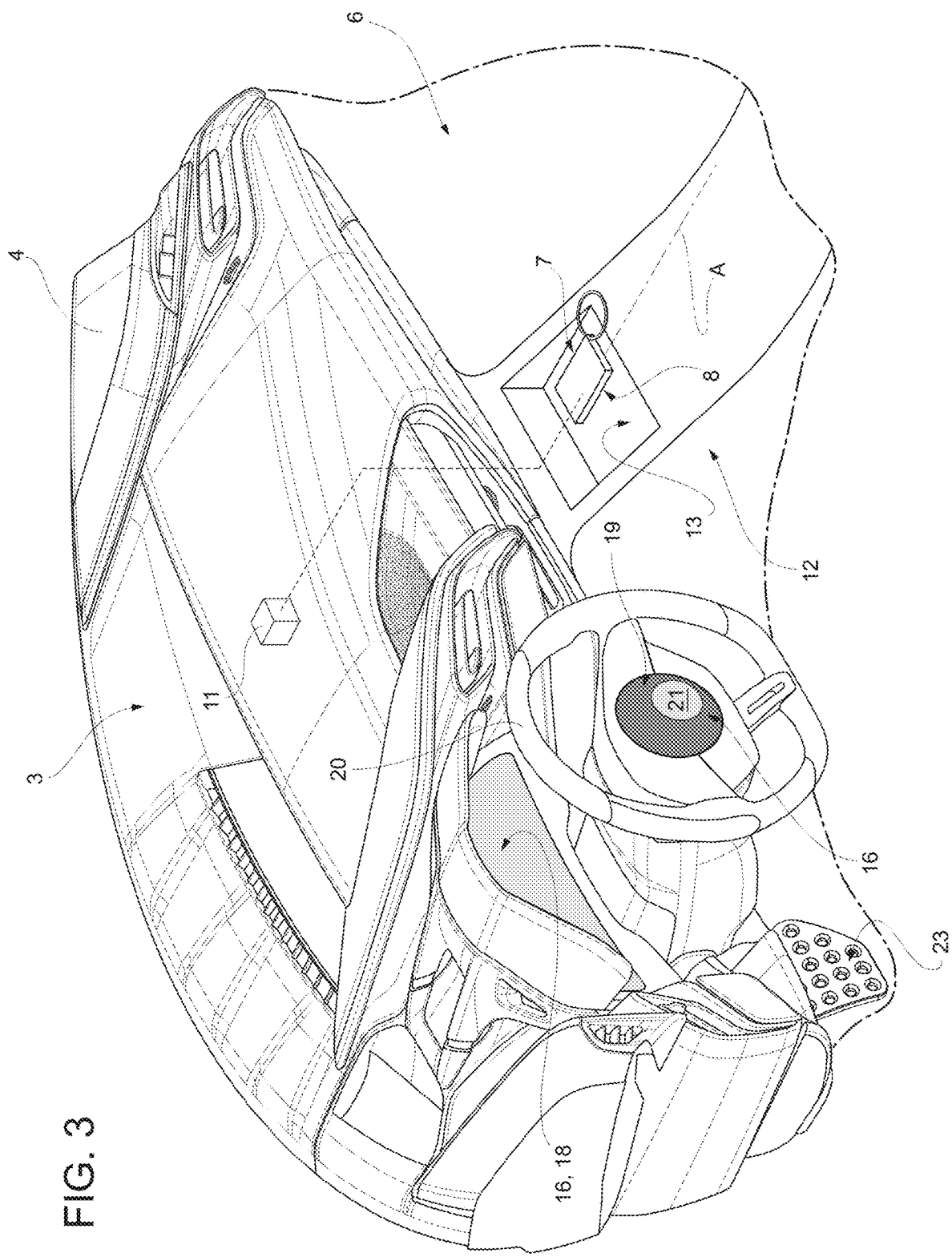
FIG. 3 is a perspective and schematic view of part of the interior of the passenger compartment of the vehicle of FIG. 1 in a first switched-on configuration.

In other cases, preferred but also non-limiting, as illustrated in FIG. 3, the luminous element 16 is a part 19 of the steering wheel 20, in particular a surface 21 arranged at a front airbag 22 (driver side).

Figure 4:
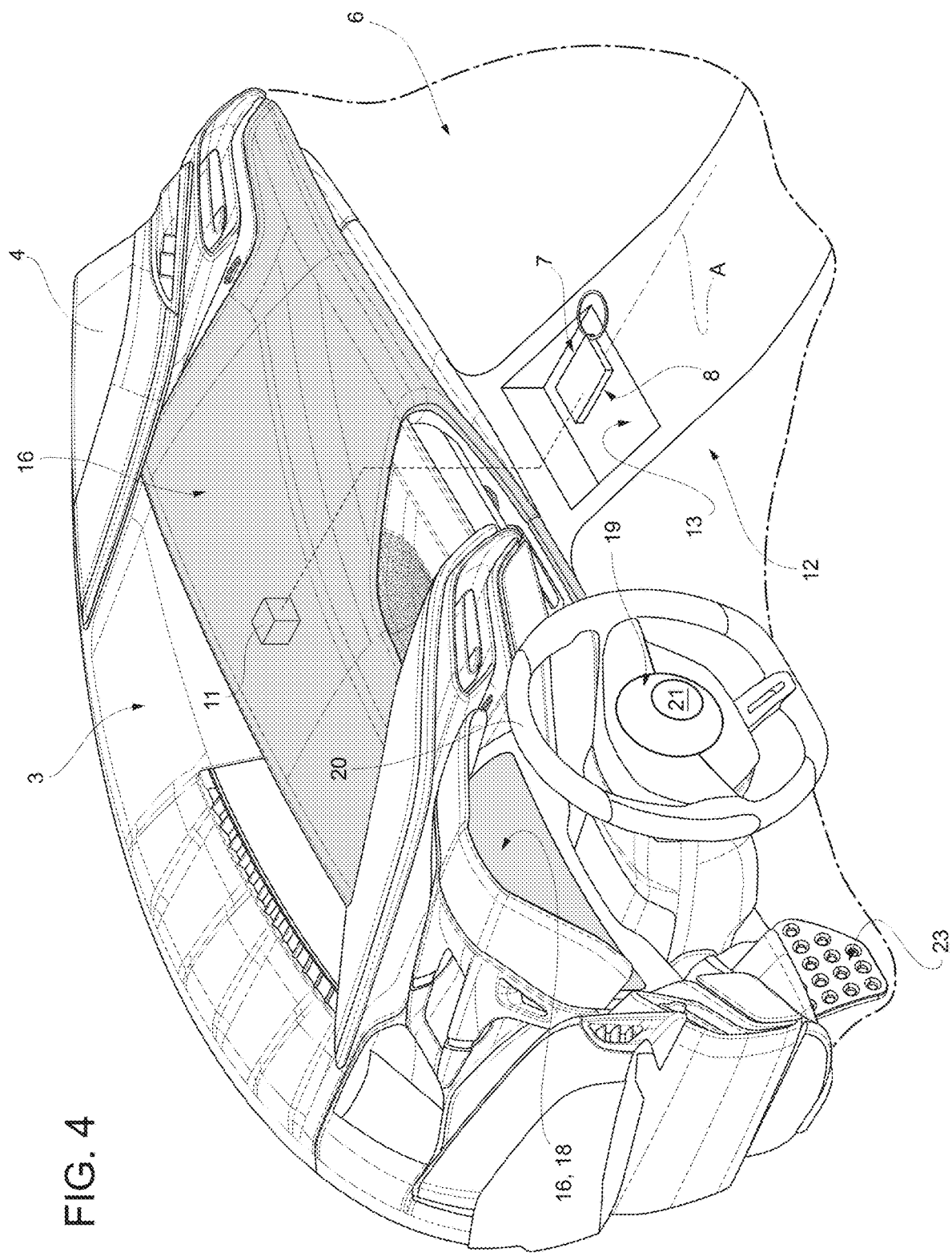
FIG. 4 is a perspective and schematic view of part of the interior of the passenger compartment of the vehicle of FIG. 1 in a second switched-on configuration.

In the non-limiting embodiment of FIG. 4, the luminous element 16 is a part of the dashboard 4, in particular any surface covering of the dashboard 4.

Figure 5:
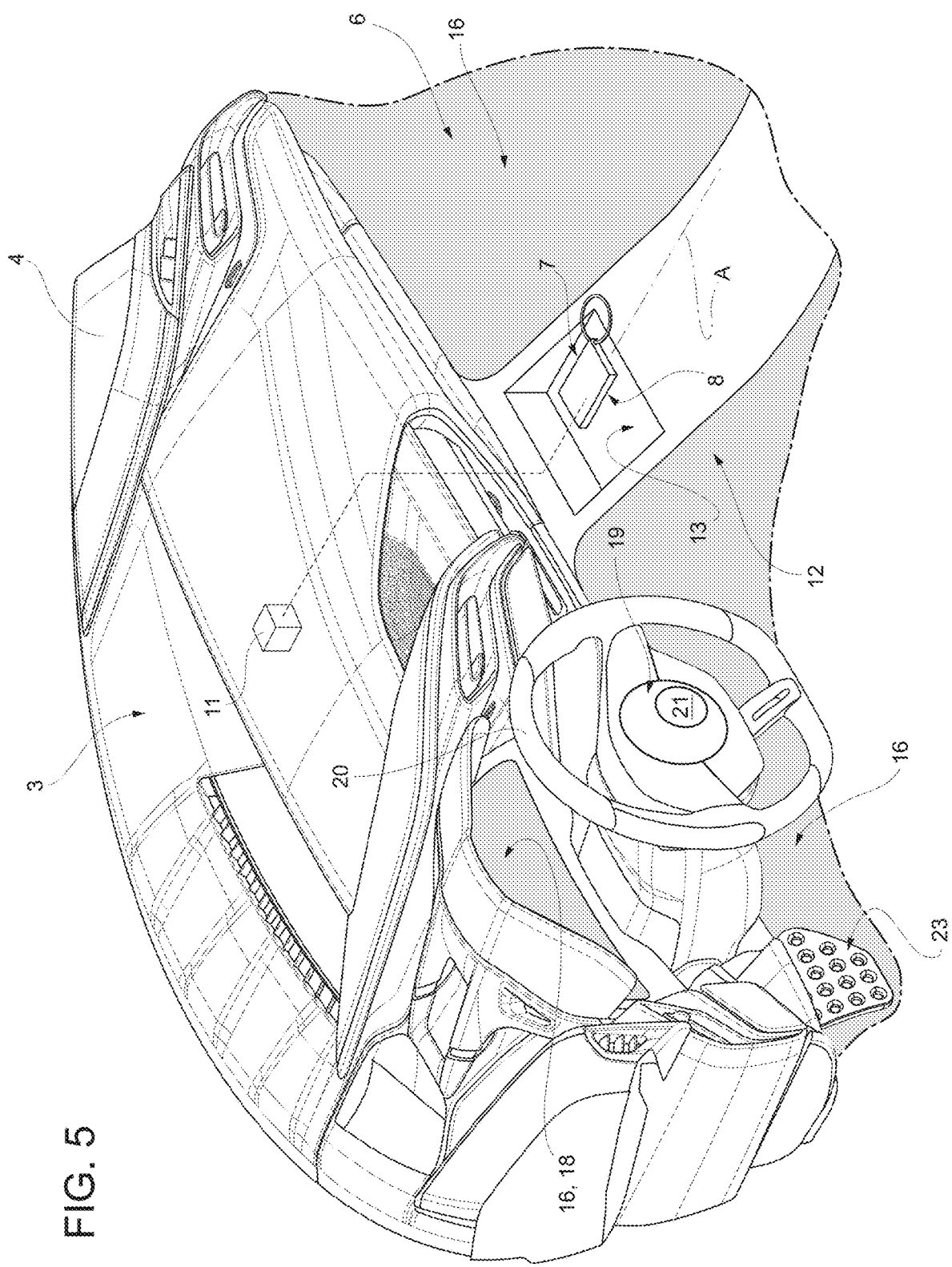
FIG. 5 is a perspective and schematic view of part of the interior of the passenger compartment of the vehicle of FIG. 1 in a third switched-on configuration.

In the non-limiting embodiment of FIG. 5, the luminous element 16 is the so-called "ambient lights", i.e. those devices light that the passenger compartment without disturbing driving (usually by means of indirect lighting), for example usually in the zone occupied by the legs of the driver or the passenger, or the contours of the buttons on the dashboard 4, or their backlights, or even luminous strips arranged on the slits of the coverings to light the passenger compartment in an indirect manner.

Figure 6:
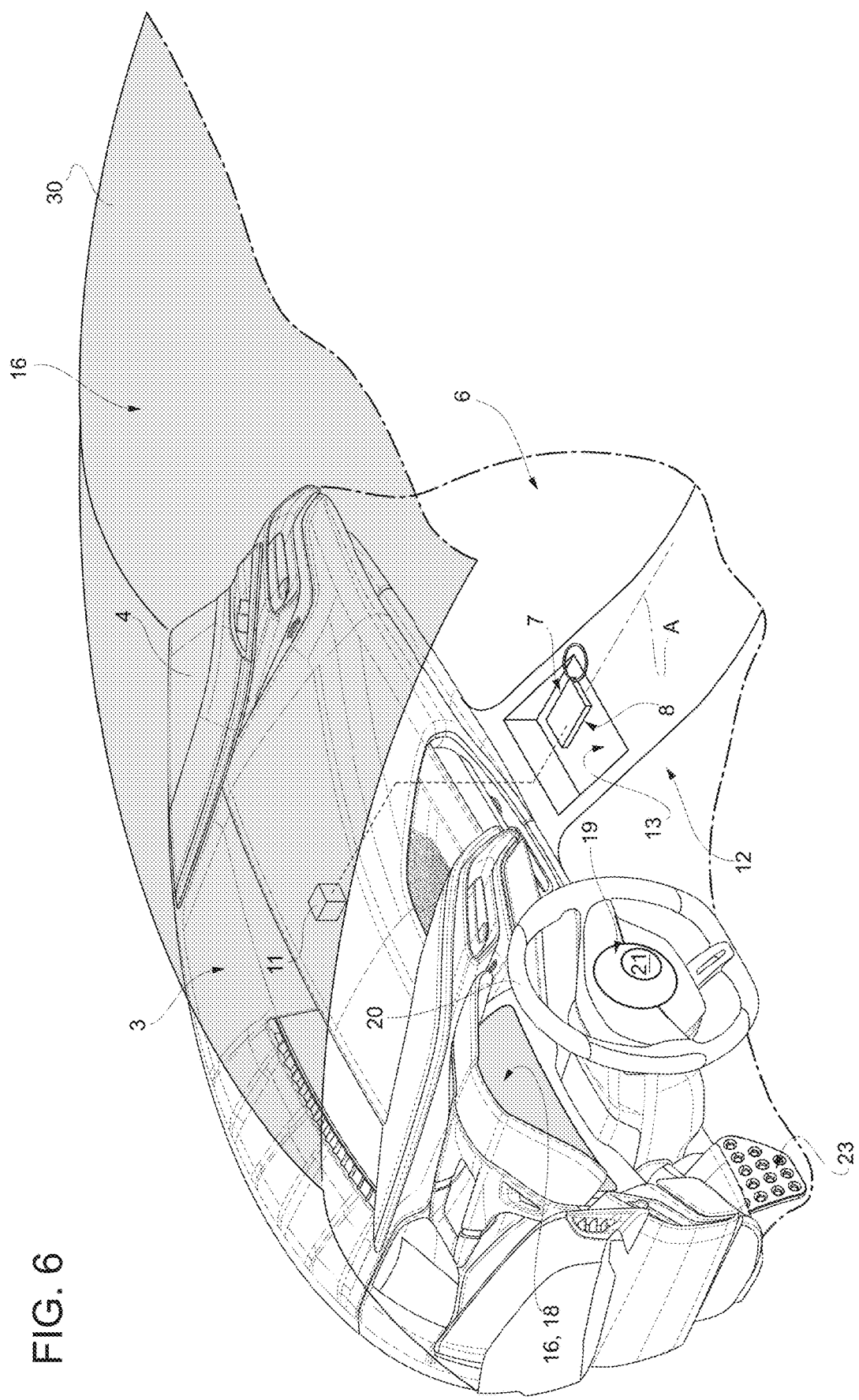
FIG. 6 is a perspective and schematic view of part of the interior of the passenger compartment of the vehicle of FIG. 1 in a fourth switched-on configuration.

In the non-limiting embodiment of FIG. 6, the luminous element 16 is a part of a vehicle roof 30, in particular any surface covering of the vehicle roof 30 inside the passenger compartment 3.

According to several non-limiting embodiments, the vehicle 1 also comprises a wireless charging system 22 for the key 7, which is arranged at the slot 8 and is configured to recharge the key 7 at least while the vehicle 1 is on the road.

In particular, the charging system 22 is a magnetic induction system, which is arranged underneath the depression 9.

As previously mentioned, preferably, the ignition system 6 does not comprise means for sensing the pressure of a pedal, in particular of a brake pedal 23. In this manner, ignition, i.e., enabling power supply to the powertrain system 5, is entirely dependent upon the position of the key 7, making the system simple, but comprehensible and reliable at the same time.

According to a further aspect of the present invention, a key 7 is provided for the ignition of a road vehicle 1 according to what has been described previously.

In particular, the key 7 comprises a basic body 24, which comprises at least one upper surface 25 and one lower surface 26.

Figure 7:
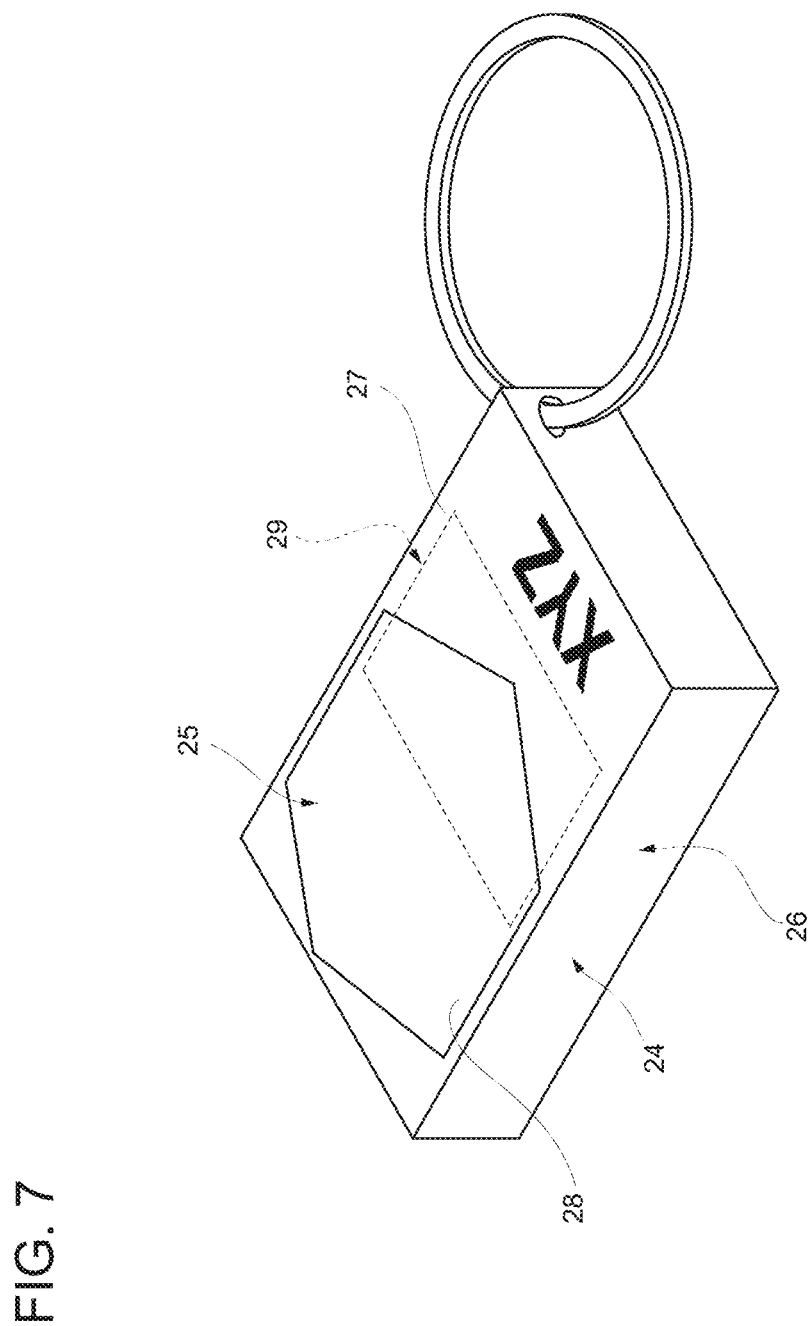
FIG. 7 is a perspective and schematic view of a key according to an embodiment of the present invention.

According to the non-limiting embodiment of FIG. 7, the basic body 24 has a substantially parallelepiped shape provided with the two facing surfaces 25 and 26, which are more extended than the other surfaces, which substantially serve as an edge.

Preferably but not in a limiting manner, the surface 26 is configured to face, in particular in contact, with the slot 8, or with the depression 9.

In particular, the key 7 also comprises a display device 27, which is arranged at the surface 25 and is configured to assume at least partially the third colour and the fourth colour, according to what has been described previously.

In accordance with what has been said so far, advantageously but not in a limiting manner, the display device 27 is configured to switch from the third colour to the fourth colour when the key 7 is placed inside the slot 8 and vice versa when the key 7 is removed from the slot 8.

In detail, the display device 27 corresponds with the part 17 of the key 7 described above.

Figure 8:
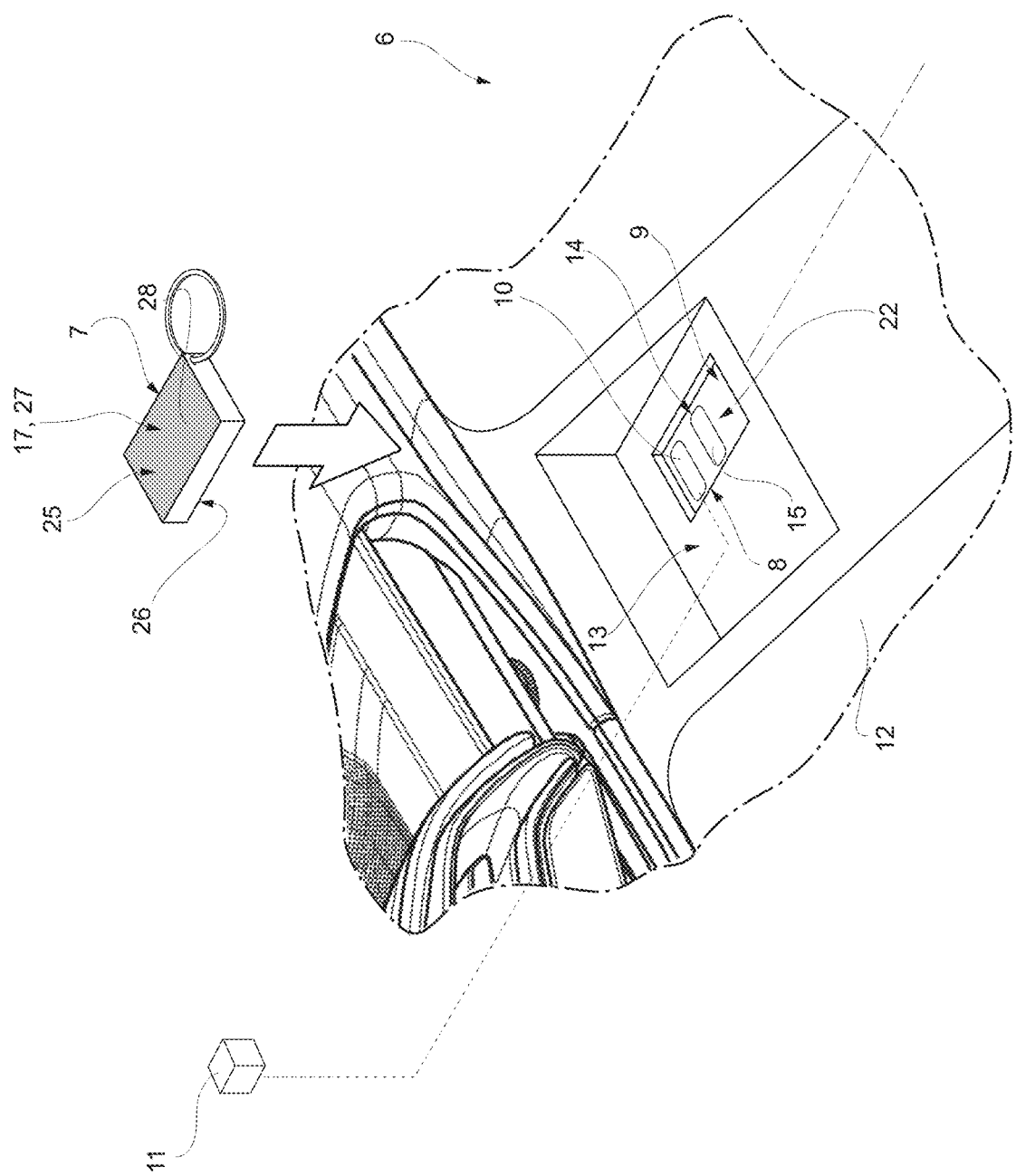
FIG. 8 is a perspective and schematic view of a detail of FIG. 2, wherein the key of FIG. 4 is in a switched-off configuration.
Figure 9:
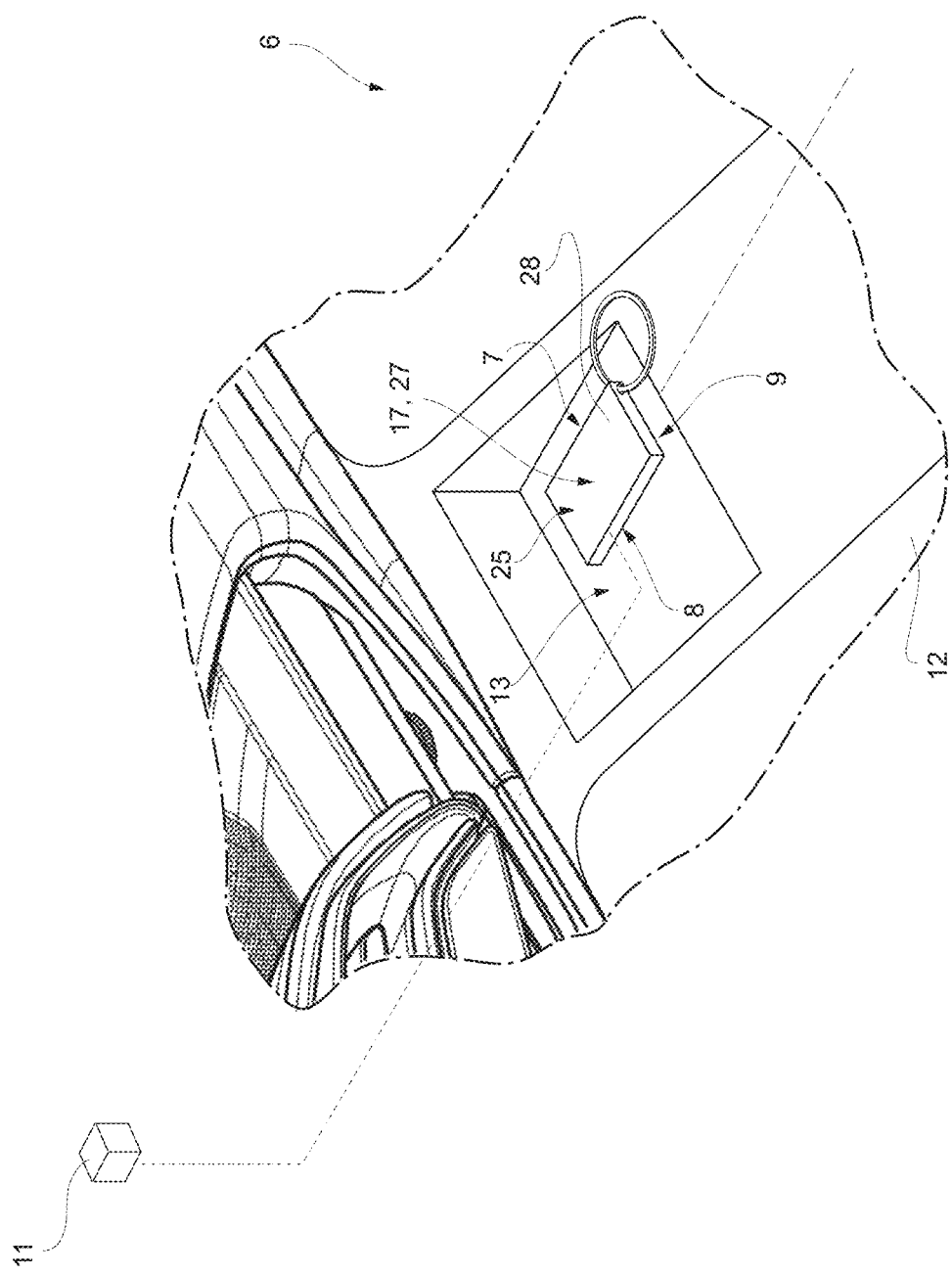
FIG. 9 is a perspective and schematic view of a detail of FIG. 2, wherein the key of FIG. 4 is in a switched-on configuration.

According to several preferred embodiments, such as those illustrated in FIGS. 7 to 9, the display device 27 comprises an electronic ink screen 28. In this manner, it is possible to reduce to a minimum the energy consumption to switch from the third colour to the fourth colour and vice versa.

According to other embodiments not illustrated, the display device 27 comprises a liquid crystal display 28 (for example, LCD or OLED). In this manner, it is possible to increase the luminosity and the flexibility in display of the contents on the screen 28, for example by adding animations for the colour change from one part to the other of the system.

In certain non-limiting cases, according to what is described previously, the key 7 comprises at least part of the key locking system 14, in particular a magnetic element complementary to the locking element 15, which is configured to anchor the key 7 to the slot 8 in case the speed of the road vehicle 1 is greater than zero and/or a gear is engaged.

Advantageously but not in a limiting manner, the key 7 comprises a battery 29, which is disposed within the basic body 24 and rechargeable while the key 7 is disposed at the slot 8. In particular, the battery 29 is configured to be charged by the charging system 22.

Preferably but not in a limiting manner, the key 7 comprises part of the control unit 11, configured to control the electronic ink screen 28 and to detect the position of the key 7 (if inside the slot 8 or not).

Figure 11:
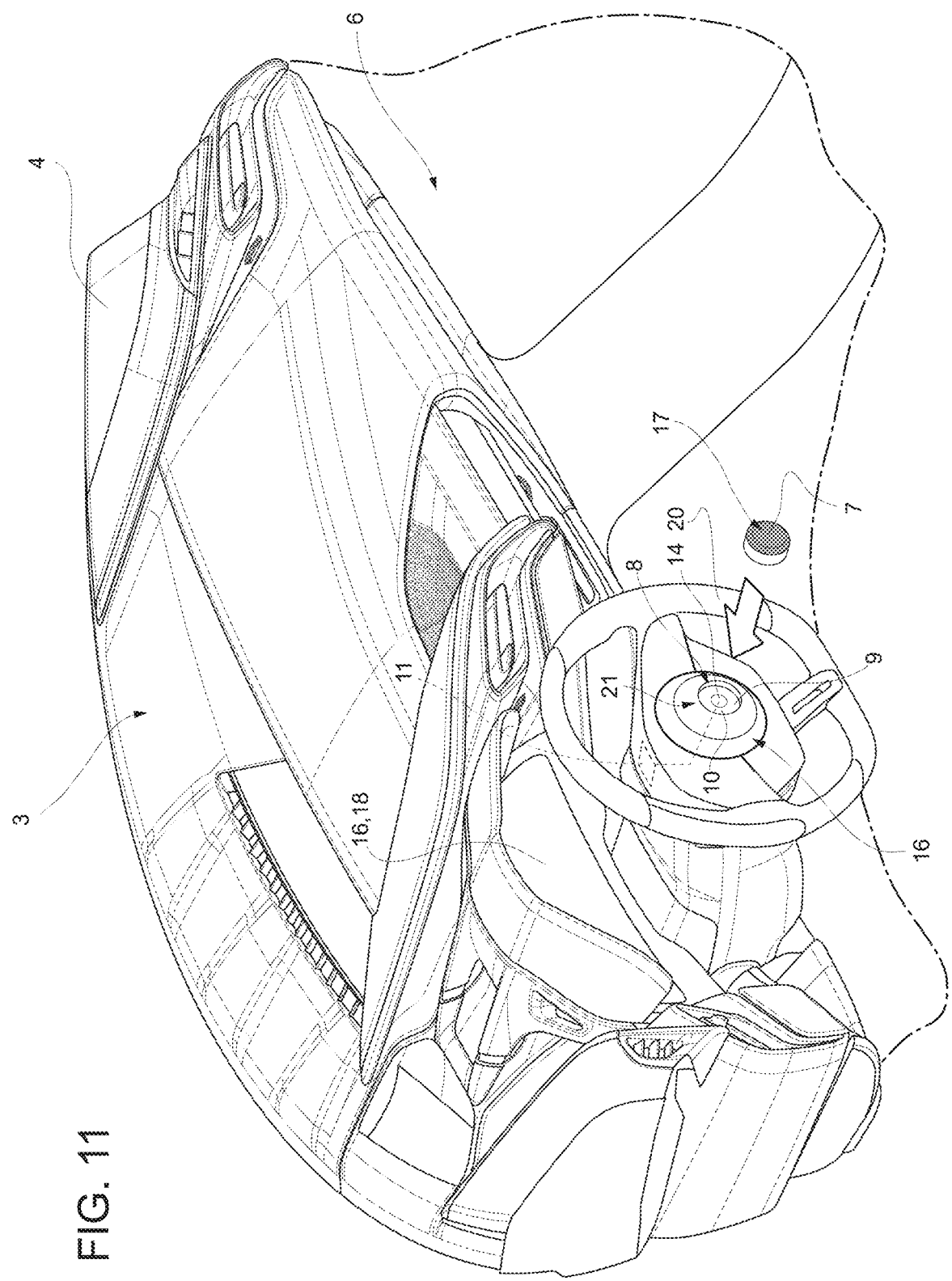
FIG. 11 is a perspective and schematic view of part of the interior of the passenger compartment according to a different embodiment of the vehicle of FIG. 1 in a switched-off configuration.
Figure 12:
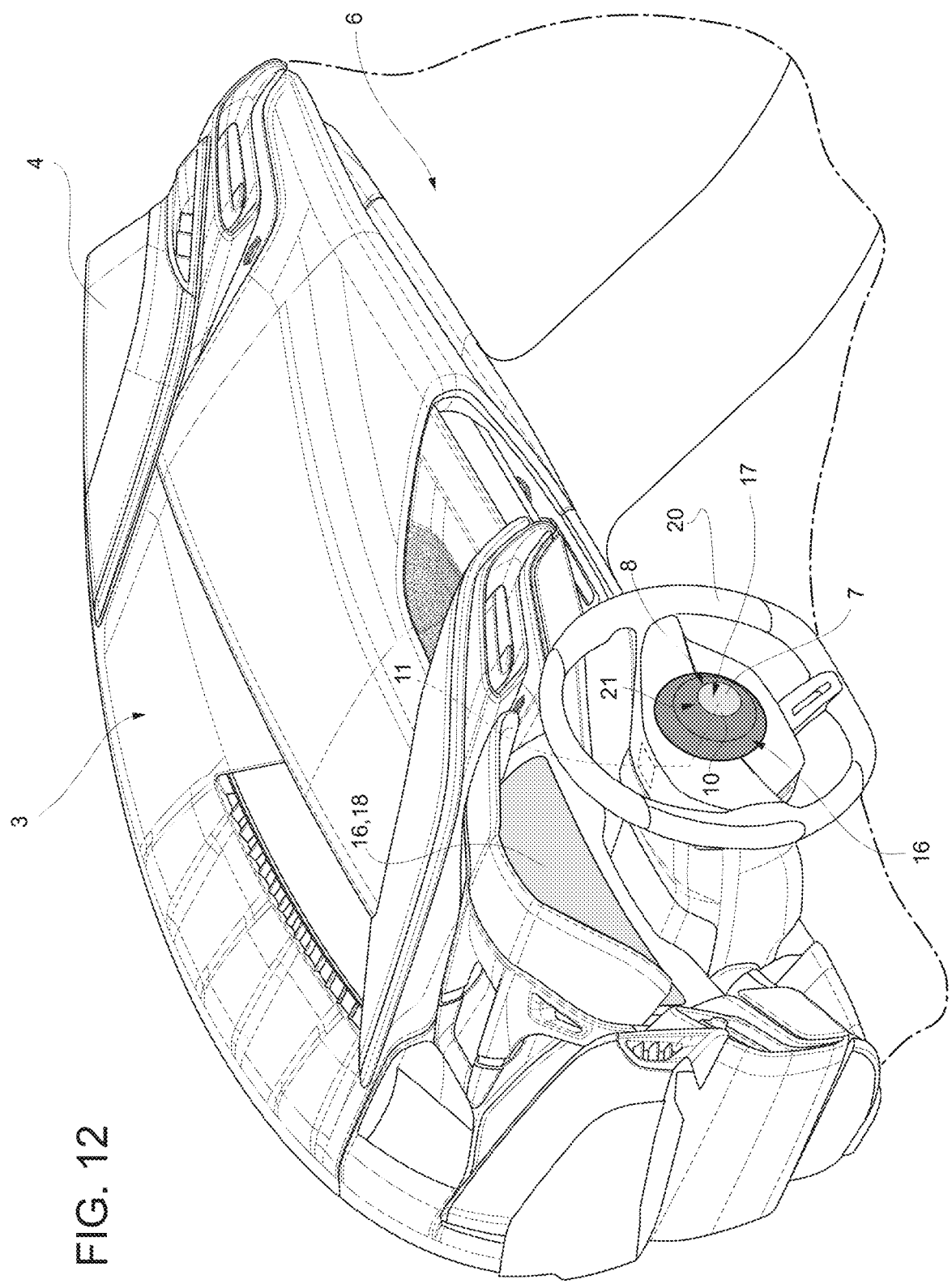
FIG. 12 is a perspective and schematic view of the respective switched-on vehicle of FIG. 11 in a configuration.

According to further non-limiting embodiments, such as the one illustrated in FIGS. 11 and 12, the slot 8 is arranged at the steering wheel 20, in particular at surface 21 (central). Preferably, therefore, the driver inserts the key 7 into the slot 8, and therefore the depression 9, horizontally. Concerning what has been stated previously in relation to the slot 8 in other positions, for example on the central tunnel 12 or on the dashboard 4, it also remains valid for this embodiment.

In use, the driver enters into the passenger compartment with the key 7 having the upper surface 25 coloured, for example yellow. The vehicle 1 is switched on, i.e., the control unit 11 enables power supply to the powertrain system 5, by positioning the key 7 in the slot 8. As soon as the detection system 10 detects the key 7, the latter is blocked by the locking system 14, changes colour, for example becomes black, and the surface 21 of the steering wheel 20 switches from black to yellow, indicating to the driver that the vehicle is effectively switched on and that it is possible to engage a gear and operate the powertrain system 5. In the same manner, in order to switch off the road vehicle 1, for example when it is in park mode, it is possible to remove the key 7 from the slot 8. As soon as the key 7 is removed, it once again assumes, thanks to the screen 28, the colour yellow for example, and the surface 21 of the steering wheel 20 turns black again.

Obviously, the colours indicated are simply examples and can be replaced with other colours. In certain cases, said colours may also be set by the driver, based on their own preferences.

Although the invention described here above makes particular reference to an example of a precise embodiment, it is not to be considered as limited to said example of an embodiment, as all scope those its includes variants, changes or simplifications covered by the attached claims, such as, for example, a different type of road vehicle (such as front-wheel drive), a different shape of the passenger compartment, different locking systems, a different type of screen, etc.

The vehicle and the key described above offer numerous advantages.

In the first place, they allow a simple and immediate indicator of the state of ignition of the vehicle to be provided to the driver.

Furthermore, they allow saving of the charge of the vehicle battery pack when the vehicle is not moving, as it is possible to switch off the vehicle 1.

A further advantage of the present invention resides in the fact that, thanks to the electronic ink screen, consumption of the key battery is minimised, and it can, in any case, be charged while on the road.

In addition, the locking system avoids sudden removals of the key and therefore suddenly and involuntarily switching off the road vehicle, thus maintaining appropriate safety.

LIST OF REFERENCE NUMBERS OF THE FIGURES 1 vehicle
2 wheels
3 passenger compartment
4 dashboard
5 powertrain system
6 ignition system
7 key
8 slot
9 depression
10 detection system
11 control unit
12 central tunnel
13 upper portion
14 key locking system
15 magnetic locking element
16 luminous element
17 part of the key
18 control panel
19 part of the steering wheel
20 steering wheel
21 surface
22 charging system
23 brake pedal
24 basic body
25 upper surface
26 lower surface
27 display device
28 electronic ink screen
29 battery
30 vehicle roof
A central axis of symmetry

The invention claimed is:

1. Road vehicle (1) comprising:
four wheels (2), of which at least one pair of wheels (2) is driven;
a passenger compartment (3);
a powertrain system (5);
an ignition system (6) for the powertrain system (5) comprising in turn a slot (8) integral with the passenger compartment (3) of the road vehicle (1) and configured to receive and accommodate a key (7) for the ignition of the road vehicle (1);
the road vehicle (1) being characterised in that the ignition system (6) comprises a detection system (10), configured to detect the presence or absence of the key (7) at the slot (8), and a control unit (11), which is connected to the detection system (10) and to the powertrain system (5) and is configured to enable the power supply to the powertrain system (5) only when the key (7) is detected at the slot (8);
the vehicle (1) comprising a luminous element (16) inside the passenger compartment (3), which is configured to assume a first colour when the key (7) is not detected inside the slot (8) and a second colour when the key (7) is detected inside the slot (8), the first colour and the second colour being different to each other.

2. Road vehicle (1) according to claim 1 and comprising a central tunnel (12), arranged along a longitudinal symmetry axis of the passenger compartment (3);
wherein the slot (8) is arranged at the central tunnel (12), in particular facing upwards.

3. Road vehicle (1) according to claim 1, wherein the slot (8) comprises a key locking system (14), which is configured to anchor the key (7) to the slot (8) in case the speed of the road vehicle (1) is greater than zero and/or a gear is engaged.

4. Road vehicle (1) according to claim 3, wherein the key (7) locking system (14) comprises a magnetic locking element (15) selectively operable by the control unit (11).

5. Road vehicle (1) according to claim 1, wherein the ignition system (6) is configured to emit a signal, in particular at the slot (8), resulting in a colour change of at least part (17) of the key (7).

6. Road vehicle (1) according to claim 5, wherein the commanded colour change is from a third colour to a fourth colour, following the positioning of the key (7) at the slot (8), and vice versa when the key (7) is removed from the slot (8).

7. Road vehicle (1) according to claim 6, wherein the third colour is equal to the second colour and the fourth colour is equal to the first colour.

8. Road vehicle (1) according to claim 1, wherein the luminous element (16) inside the passenger compartment (3) is a part (19) of the steering wheel (20), in particular a surface arranged at a front airbag.

9. Road vehicle (1) according to claim 1, and comprising a wireless charging system (22) for the key (7), which is arranged at the slot (8) and is configured to recharge the key (7) at least while the vehicle (1) is on the road.

10. Road vehicle (1) according to claim 1, wherein the ignition system (6) does not comprise means for sensing the pressure of a pedal, in particular of a brake pedal (23).

11. Key (7) for igniting a road vehicle (1) according to claim 1;
the key (7) comprising:
a base body (24) comprising at least one upper surface (25) and one lower surface (26), opposed to each other;
a display device (27) arranged in correspondence with the upper surface (25) and configured to at least partially assume a third colour and a fourth colour;
wherein the display device (27) is configured to switch from the third colour to the fourth colour when the key (7) is placed inside the slot (8) and vice versa when the key (7) is removed from the slot (8).

12. Key (7) according to claim 11, wherein the display device (27) comprises an electronic ink screen (28).

13. Key (7) according to claim 11 and comprising at least part of a locking system, in particular a magnetic element, which is configured to anchor the key (7) to the slot (8) in case the speed of the road vehicle (1) is greater than zero and/or a gear is engaged.

14. Key (7) according to claim 11 and comprising a battery (29), disposed within the basic body (24) and rechargeable while the key (7) is disposed at the slot (8).

\* \* \* \* \*